Figures 3, 4:
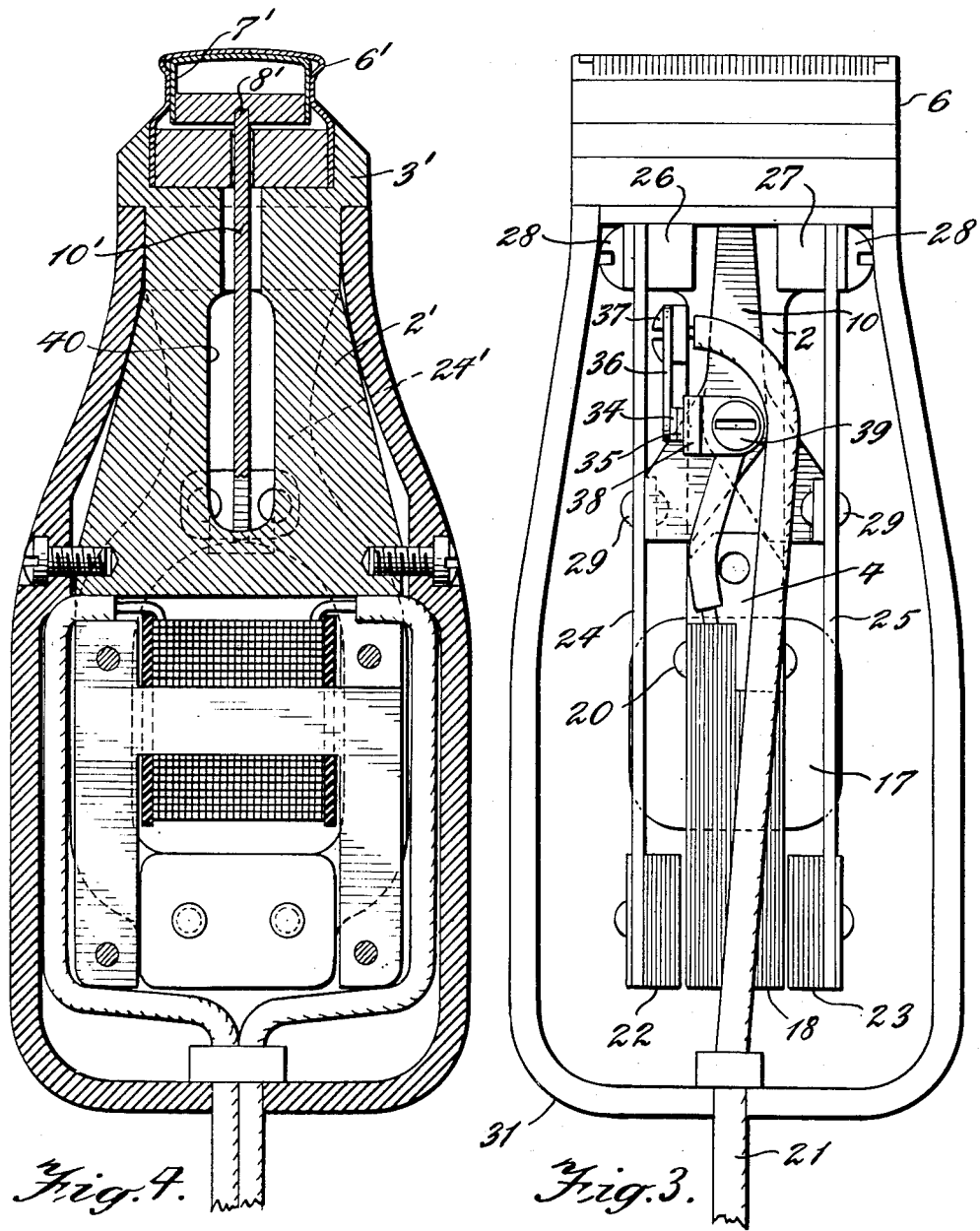

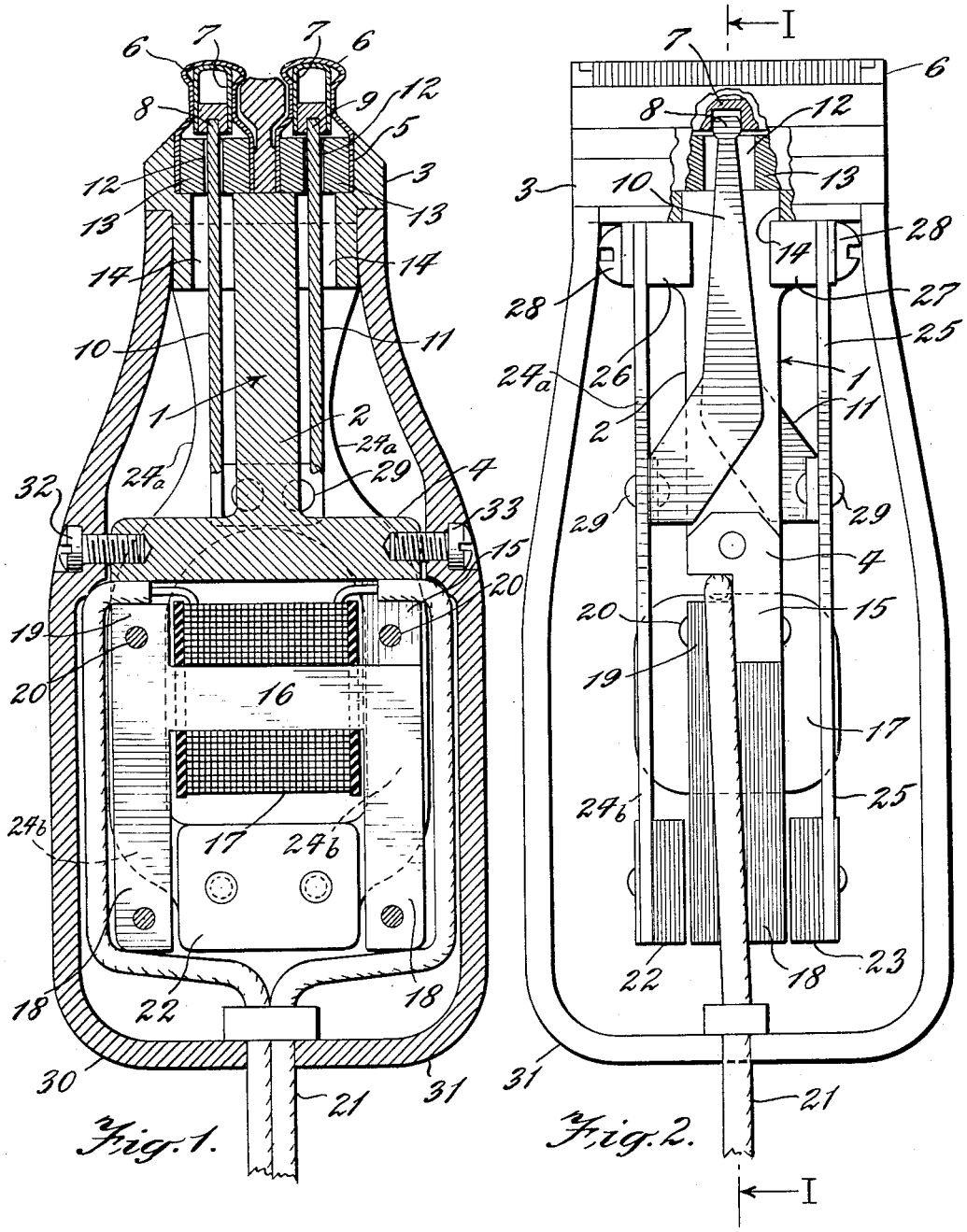

April 10, 1956 K. G. MEYERINK 2,741,711
ELECTRIC SHAVER VIBRATOR MOTOR
Filed Feb. 16, 1951 2 Sheets-Sheet 2

INVENTOR
Kors G. Meyerink
BY
Burgess Ryan & Hicks
ATTORNEYS

2,741,711

ELECTRIC SHAVER VIBRATOR MOTOR

Kors G. Meyerink, Cos Cob, Conn., assignor to Schick Incorporated, Stamford, Conn., a corporation of Delaware Application February 16, 1951, Serial No. 211,370

4 Claims. (Cl. 310—29)

The primary object of this invention is an improved motor of the so-called resonant reed type especially adapted for driving the shearing head cutters of electric shavers. The invention is in the nature of an improvement on the type of motor illustrated in Patent No. 2,259,131, dated October 14, 1941.

A further object of the invention is a motor of the above character built around a frame or chassis which, as illustrated and described herein in its preferred form, serves as the support for the shearing head or heads, permitting the plastic case halves of the shaver to take the form of simple covers capable of being themselves connected directly to the frame or chassis. This by contrast with the standard arrangement in which the case halves at one end are formed as jaws to receive and support the shearing head or heads.

Other objects and advantages of the invention, including economy of manufacture and ease of assembly, will be apparent from the following description of the principles of the invention as exemplified in the accompanying drawings.

In the drawings, Fig. 1 is a vertical, longitudinal section of a shaver embodying the invention, the section being taken on the line I—I of Fig. 2; Fig. 2 is a partially broken-out front elevation of the same shaver with one of the case halves removed; Fig. 3 is a view similar to Fig. 2 showing the shaver motor equipped with contacts to adapt it for D. C. operation; and Fig. 4 is a view corresponding to Fig. 1 but showing a modification.

In the form of the invention illustrated in Figs. 1 and 2, there is provided a frame or chassis, generally designated 1, consisting of a post or a body portion 2 having a head 3 at its upper end and a wide base portion 4. For convenience, the terms "upper" and "lower" are used herein to accord with the position of the shaver as illustrated in the drawings, the upper end thus being the shearing head end. The head 3 is formed with a channel 5 to receive shearing heads 6. These shearing heads, which may be secured to the head of the chassis in any conventional or preferred way, are shown as including cutters 7 adapted to receive and be reciprocated by the upper ends 8, 9 of actuators 10, 11. As usual, the actuators project through openings 12 in the base blocks 13 of the shearing heads and also, in this instance, through openings 14 in the chassis head 3. As will be recognized, the chassis may thus be formed as an integral die-casting.

Depending, at the sides, from the base portion of the chassis are lugs or shoulders 15 of reduced thickness forming supports for the field unit of the motor. As shown, this unit is made up essentially of inverted U-shaped laminations including a cross bar 16 on which the field coil 17 is wound and depending legs or pole pieces 18. Some of the laminations have short upward extensions 19 to overlap the lugs 15, to which the field unit is secured, as by rivets 20. As will be understood, the coil is energized through cord 21.

The twin armatures 22, 23, likewise laminated, are secured to the free ends of flat, cantilever springs 24, 25. At their upper ends, adjacent the head 3, the armature springs are secured to chassis bosses 26, 27. With the springs thus seated on the bosses and with their squared upper ends abutting the underside of chassis head 3, they can be secured to the chassis by single screws 28. As will be seen, the actuators are secured to the inner sides of the respective springs, as by rivets 29 or welding, intermediate the mid-points and the upper ends of the springs; and the springs locate the armatures so that in the at rest position the leading or inner faces of the armatures are substantially aligned with the outer faces of the field poles. In the drawings, clearance has been indicated simply to separate the armature and field laminations for purposes of clearer illustration.

In accordance with the invention the springs are so formed that they are not of uniform flexibility throughout their length but rather so that at one or more points or zones in their length their flexibility is increased, as by incorporating a smaller and hence weaker section. Thus, in the illustrated form, the upper part of the spring 24 tapers to a reduced neck section 24a and then expands to the greater width indicated at the point of attachment of the actuators. Spring 25 is similarly formed. In this preferred form, there is a second weakened zone resulting from the fact that the lower portions of the springs take the form of loops of which the aggregate of the sections of the two side arms (marked 24b on spring 24) is less than the section at the point of attachment of the actuator. The spring section increases again at the point of mounting of the armature.

In the preferred arrangement (for A. C. operation), the springs are timed to a frequency slightly below twice that of the power supply, 118 or 119 cycles, for example, being appropriate with a 60 cycle supply. By this arrangement, increasing load applied to the shearing head tends to stiffen the spring system and bring it into resonance with the electrical frequency. The sensitivity of the system can be varied by varying the tuning of the springs. With both springs tuned to the same frequency, their response to load change is sharp and rapid; whereas if the springs are tuned to slightly different frequencies, sensitivity is decreased.

By reason of the location of the power take-off and the local flexibility imparted to the springs, the later partake of a whip action which is highly desirable. As will be recognized, the increased local flexibility imparted to the springs increases the travel of the armature end of each spring, thereby securing rapid acceleration of the armatures and a mechanical power advantage with respect to the driving of the shearing head cutters. In point of fact, the armatures are actually in motion before the cutters move and the motion of the armatures continues after the cutters have come to rest at the end of their stroke.

By using the chassis to support the shearing heads, the motor requires only a simple form of cover which may conveniently take the form of identical case halves 30, 31 abutting the head 3 at their upper ends and secured to the chassis by screws 32, 33.

The arrangement illustrated in Fig. 3 is designed to adapt the motor for D. C. operation and for that purpose incorporates make-and-break contacts 34, 35 in the circuit of coil 17 adapted to be opened and closed by the action of one of the springs. In all other respects the construction is precisely the same as that already described and therefore the same reference characters are applied to corresponding parts. Thus, stationary contact 34 is mounted on an arm 36 secured by screw 37 to the chassis post 2; and contact 35 is carried by a bracket 38 secured by screw 39 to actuator 10.

It will be understood that the motor can be applied to operate the cutter of a shaver head requiring only one actuator, in which case one only of the springs is required for driving purposes, while the other runs idle and serves as a vibration damper. One form of such arrangement is illustrated in Fig. 4. In that construction the chassis head 3' is shown as supporting a shearing head 6' having a single inner cutter 7', the latter receiving and being driven by the upper end 8' of a centrally located actuator 10'. In this instance the post portion 2' of the chassis is widened out and has a central channel 40 to accommodate the actuator, the latter being secured to the inner side of tapered armature spring 24'. Except for the absence of a second actuator, the arrangement, in all other respects, is just like that illustrated in Fig. 1 and its description need not be repeated.

In the light of the foregoing description of embodiments illustrative of the principles of the invention, the following is claimed:

1. In a resonant reed motor, the combination of a spring supported at one end and having an armature secured thereto at its free end; a rigid power take-off member adapted to be coupled to a driven member and secured to the spring at an intermediate point in its length; the cross section of the spring between the point of attachment of the power take-off member and the armature being less than the cross section at said point of attachment, whereby increased flexibility is imparted to the armature end of the spring; and the cross section of the spring between its supported end and said point of attachment being less than that at the said point of attachment but greater than that of the portion of the spring between said point and the armature.

2. In a resonant reed motor, the combination of a pair of opposed, similar springs each supported at one end and carrying similar armatures at their free ends; a rigid power take-off member secured to each of said springs at an intermediate point in its length; means for relatively increasing the amplitude of vibration, under loads applied to the power take-off members, of the armature ends of the two springs, the latter being tuned to slightly different frequencies below twice that of the power supply.

3. In a resonant reed motor, the combination of a pair of opposed, similar springs each supported at one end and carrying similar armatures at their free ends; a rigid power take-off member secured to each of said springs; the latter being tuned to slightly different frequencies below twice that of the power supply.

4. In a resonant reed motor, the combination of a pair of spaced, opposed, similar springs each supported at one end and carrying similar armatures at their free ends; at least one rigid power take-off member secured to one of said springs at a point spaced from the ends of such spring and extending between the springs in the direction of and beyond their said supported ends, the free end of the take-off member being adapted for connection to a driven member; and means for relatively increasing the amplitude of vibration of the armature ends of the two springs.

References Cited in the file of this patent

UNITED STATES PATENTS

| | | |
|---|---|---|
| 1,891,486 | Wahl | Dec. 20, 1932 |
| 2,036,917 | Favre-Bulle | Apr. 7, 1936 |
| 2,239,931 | Prescott | Apr. 29, 1941 |
| 2,251,419 | Prescott | Aug. 5, 1941 |
| 2,299,952 | Jepson | Oct. 27, 1942 |
| 2,483,086 | Coake | Sept. 27, 1949 |

FOREIGN PATENTS

| | | |
|---|---|---|
| 916,492 | France | Aug. 19, 1946 |